United States Patent
Chen et al.

(10) Patent No.: US 10,285,167 B2
(45) Date of Patent: May 7, 2019

(54) UPLINK RESOURCE ALLOCATION AND TRANSPORT BLOCK SIZE DETERMINATION OVER UNLICENSED SPECTRUM

(71) Applicant: QUALCOMM Incorporated, San Diego, CA (US)

(72) Inventors: Wanshi Chen, San Diego, CA (US); Yongbin Wei, San Diego, CA (US); Tao Luo, San Diego, CA (US); Tingfang Ji, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 183 days.

(21) Appl. No.: 14/490,390

(22) Filed: Sep. 18, 2014

(65) Prior Publication Data

US 2015/0085794 A1 Mar. 26, 2015

Related U.S. Application Data

(60) Provisional application No. 61/880,484, filed on Sep. 20, 2013.

(51) Int. Cl.
*H04W 72/04* (2009.01)
*H04B 7/0413* (2017.01)
*H04L 5/00* (2006.01)

(52) U.S. Cl.
CPC ........ *H04W 72/042* (2013.01); *H04B 7/0413* (2013.01); *H04L 5/0053* (2013.01); *H04L 5/0092* (2013.01); *H04L 5/0007* (2013.01)

(58) Field of Classification Search
CPC .................................................. H04W 72/042
See application file for complete search history.

(56) References Cited

U.S. PATENT DOCUMENTS 7,885,230 B2 * 2/2011 Seo ........................ H04L 1/0071
370/329
9,030,977 B2 5/2015 Chen et al.
(Continued)

FOREIGN PATENT DOCUMENTS

EP 2 635 082 A1 9/2013
WO WO-2010/049754 A1 5/2010
(Continued)

OTHER PUBLICATIONS

International Search Report and Written Opinion—PCT/US2014/056554—ISA/EPO—dated Dec. 16, 2014. (12 total pages).
(Continued)

*Primary Examiner* — Derrick W Ferris
*Assistant Examiner* — Kevin H Lee
(74) *Attorney, Agent, or Firm* — Arent Fox, LLP

(57) ABSTRACT

Methods and apparatus for determining a transport block size include identifying data to be transmitted on an uplink, wherein the data is associated with a number of resource blocks. The methods and apparatus further include receiving at least one indicated coefficient via a downlink control information. Additionally, the methods and apparatus include determining at least one coefficient based on the at least one indicated coefficient and calculating a transport block size column index based on the number of resource blocks and the at least one coefficient. Moreover, the methods and apparatus include determining the transport block size based at least in part on the transport block size column index. The methods and apparatus may transmit the data on the uplink based at least in part on the transport block size.

29 Claims, 8 Drawing Sheets

(56) References Cited

U.S. PATENT DOCUMENTS

| | | | |
|---|---|---|---|
| 2009/0098899 A1* | 4/2009 | Gorokhov | H04W 52/146 |
| | | | 455/522 |
| 2010/0195614 A1 | 8/2010 | Nimbalker et al. | |
| 2011/0085513 A1 | 4/2011 | Chen et al. | |
| 2011/0170625 A1* | 7/2011 | Blankenship | H04L 1/007 |
| | | | 375/295 |
| 2011/0276747 A1* | 11/2011 | Fuchs | H04L 1/1874 |
| | | | 711/103 |
| 2012/0322479 A1* | 12/2012 | Hakola | H04W 24/04 |
| | | | 455/507 |
| 2013/0114532 A1* | 5/2013 | Choi | H04W 72/042 |
| | | | 370/329 |
| 2013/0273954 A1* | 10/2013 | Ji | H04L 5/0057 |
| | | | 455/509 |
| 2013/0308504 A1* | 11/2013 | Nimbalker | H04L 5/001 |
| | | | 370/281 |
| 2015/0195069 A1* | 7/2015 | Yi | H04L 5/0053 |
| | | | 370/329 |

FOREIGN PATENT DOCUMENTS

| | | |
|---|---|---|
| WO | 2011047253 A1 | 4/2011 |
| WO | WO-2013/119158 A1 | 8/2013 |

OTHER PUBLICATIONS

"3rd Generation Partnership Project; Technical Specification Group Radio Access Network; Evolved Universal Terrestrial Radio Access (E-UTRA); Physical layer procedures (Release 11)", 3GPP Standard; 3GPP TS 36.213, 3rd Generation Partnership Project (3GPP), Mobile Competence Centre; 650, Route Des Lucioles; F-06921 Sophia-Antipolis Cedex; France, vol. RAN WG1, No. V11.3.0, Jun. 25, 2013 (Jun. 25, 2013). pp. 1-176, XP050692859, [retrieved on Jun. 25, 2013].

* cited by examiner

UPLINK RESOURCE ALLOCATION AND TRANSPORT BLOCK SIZE DETERMINATION OVER UNLICENSED SPECTRUM

CLAIM OF PRIORITY

The present application for patent claims priority to Provisional Application No. 61/880,484 entitled "METHOD AND APPARATUS UPLINK RESOURCE ALLOCATION AND TRANSPORT BLOCK SIZE DETERMINATION OVER UNLICENSED SPECTRUM" filed Sep. 20, 2013, which is assigned to the assignee hereof and hereby expressly incorporated by reference herein.

BACKGROUND

Aspects of the present disclosure relate generally to wireless communications and, more particularly, to method and apparatus for uplink resource allocation and transport block size determination over unlicensed spectrum.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by the Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

A significant amount of unlicensed spectrum is unused or lightly used. Such unlicensed spectrum may be useful for various types of wireless communications, including, for example, rural broadband deployments in difficult to reach places, providing broadband access in underserved markets, and Machine-to-Machine (M2M) communications. As such, unlicensed spectrum use may provide additional bands and significantly enhance the evolution of wireless communications over a wide variety of wireless access technologies in terms of both capability and functionality. The use of LTE over unlicensed spectrum may be referred to as "LTE-U."

Using LTE over unlicensed spectrum may necessitate using techniques for various aspects of wireless communications that are different from those used for traditional LTE. As such, standardized techniques related to uplink (UL) resource allocation and transport block size (TBS) in LTE over licensed spectrum may not be successfully applied to use of LTE over unlicensed spectrum (e.g., in LTE-U).

As such, improvements in uplink resource allocation and transport block size (TBS) determination over unlicensed spectrum may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method of determining a transport block size includes identifying data to be transmitted on an uplink, wherein the data is associated with a number of resource blocks. The method further includes receiving at least one indicated coefficient via downlink control information. Additionally, determining at least one coefficient based on the at least one indicated coefficient and calculating a transport block size column index based on the number of resource blocks and the at least one coefficient. Moreover, the method includes determining the transport block size based at least in part on the transport block size column index. The method includes transmitting the data on the uplink based at least in part on the transport block size.

In another aspect, a computer readable medium storing computer executable code includes code executable to identify data to be transmitted on an uplink, wherein the data is associated with a number of resource blocks. The computer readable medium further includes code executable to receive at least one indicated coefficient via downlink control information and code executable to determine at least one coefficient based on the at least one indicated coefficient. Additionally, the computer readable medium includes code executable to calculate a transport block size column index based on the number of resource blocks and the at least one coefficient. Moreover, the computer readable medium includes code executable to determine a transport block size based at least in part on the transport block size column index. The computer readable medium includes code executable to transmit the data on the uplink based at least in part on the transport block size.

In a further aspect, an apparatus for determining a transport block size includes means for identifying data to be transmitted on an uplink, wherein the data is associated with a number of resource blocks. The apparatus further includes means for receiving at least one indicated coefficient via downlink control information. Additionally, the apparatus includes means for determining at least one coefficient based on the at least one indicated coefficient and means for calculating a transport block size column index based on the number of resource blocks and the at least one coefficient. Moreover, the apparatus includes means for determining the transport block size based at least in part on the transport block size column index. The apparatus includes means for transmitting the data on the uplink based at least in part on the transport block size.

In an additional aspect, an apparatus for determining a transport block size includes a data identification component configured to identify data to be transmitted on an uplink, wherein the data is associated with a number of resource blocks. The apparatus further includes a coefficient determination component configured to receive at least one indicated coefficient via downlink control information and determine at least one coefficient based on the at least one indicated coefficient. Additionally, the apparatus includes a transport block size column index calculation component configured to calculate a transport block size column index based on the number of resource blocks and the at least one coefficient. Moreover, the apparatus includes a transport block size determination component configured to determine the transport block size based at least in part on the transport block size column index. The apparatus includes a transmitter configured to transmit the data on the uplink based at least in part on the transport block size.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects may be employed and the described aspects are intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, where a dashed line may indicate an optional component or action, and in which.

DETAILED DESCRIPTION

Figure 1:
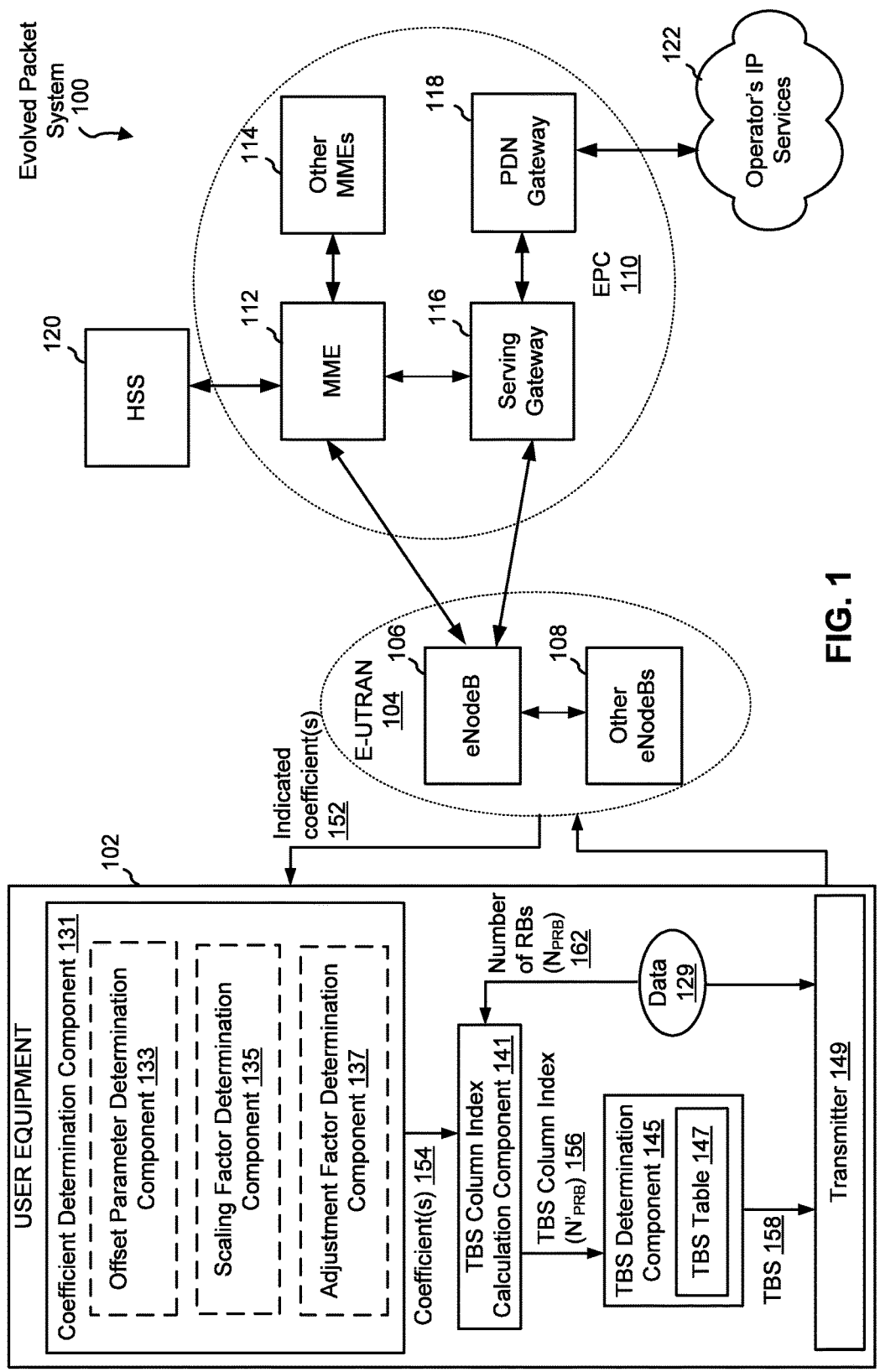
FIG. 1 is a diagram illustrating an example of a network architecture, including a user equipment having aspects configured for uplink resource allocation and transport block size determination over unlicensed spectrum.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts. In an aspect, the term "component" as used herein may be one of the parts that make up a system, may be hardware or software, and may be divided into other components.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

Wireless communications according to LTE have been standardized in the 3GPP family of specifications, which are publicly available. However, such standards may need to be adjusted for wireless communications according to LTE over unlicensed spectrum, which may be referred to as LTE-U, for various reasons. In one example, regulations related to using occupied channel bandwidth (also referred to as occupied bandwidth or occupied BW) within the unlicensed spectrum may affect LTE-U in the uplink (UL). Occupied channel bandwidth may be defined by a frequency sweep of 0.5% energy to 99.5% energy and an effective span of at least 80% of the nominal bandwidth (e.g., Occupied Channel Bandwidth≥0.80×Nominal BW) at least most of the time. In the uplink, LTE use over licensed spectrum (e.g., not LTE-U) is a single-carrier (SC) frequency-division multiple access (SC-FDMA) scheme or a two-cluster based uplink resource allocation, which may not meet these requirements for occupied channel bandwidth (e.g., standard SC-FDMA may not meet the 80% requirement).

As such, various aspects of uplink transmissions in LTE over unlicensed spectrum (e.g., LTE-U) may be adjusted in relation to the standardized LTE techniques in order to satisfy these and other regulatory requirements. In two, non-limiting examples, standardized LTE techniques related to uplink resource allocation and transport block size (TBS) determination may be adjusted for use in LTE-U. As such, it may be useful to provide a description of uplink resource allocation and TBS determination in LTE over licensed spectrum (e.g., not LTE-U).

In LTE over licensed spectrum (e.g., not LTE-U), two types of uplink resource allocation schemes (e.g., which specify the way in which a scheduler may allocate resource blocks (RBs) for each transmission), are supported. In Type 0, there is contiguous uplink resource allocation, meaning that resources are allocated within each slot. Slot hopping may be enabled and uses a one-bit flag. The number of bits for resource allocation is determined by the formula number of bits=ceiling(log 2(N*(N+1)/2)), where N is the number of physical resource blocks (PRB) in the uplink. For example, if N=100 RBs for a 20 MHz system, the number of bits used for resource allocation may be 13.

In Type 1, there may be dual-cluster uplink resource allocation. Slot hopping is not allowed in Type 1, which means that the one-bit reserved for the slot hopping flag (as described with respect to Type 0) is available and may be used for some other data and/or function. In Type 1, different downlink control information (DCI) formats are available. In an aspect, DCI may indicate resource assignments in the uplink and/or downlink for a radio network temporary identifier. Specifically, a DCI may include control signaling messages transmitted on the Physical Downlink Control Channel (PDCCH), including for example downlink resource assignments (for the Physical Downlink Shared Channel (PDSCH)) and uplink transmission grants (for the Physical Uplink Shared Channel (PUSCH)).

For example, for DCI format 0, the number of bits for resource allocation is given by the formula number of bits=1+ceiling(log 2(N*(N+1)/2)), where the additional one bit (e.g., the addition of 1 in the formula) is the unused one-bit slot hopping flag. For DCI format 4, the number of bits for resource allocation is given by the formula number of bits=max{ceiling(log 2(N*(N+1)/2)), ceiling(log 2(Nchoosek(ceiling(N/P)+1,4)))}, where P is the resource block group (RBG) size, which may be up to 4 RBs depending on system bandwidth.

In LTE over licensed spectrum (e.g., not LTE-U), uplink TBS may be determined based on (1) a number of RBs needed to transmit particular data, and (2) a modulation coding scheme (MCS), which is associated with the system configuration, both of which are indexed to the PUSCH. The PUSCH may be an uplink channel carrying scheduled data traffic, and in some aspects, control signaling transmitted in the same subframe. Additionally, the MCS may indicate or otherwise encompass the modulation order and code rate of a transmission. The MCS may include the information data rate of a transmission. Further, the TBS may indicate or correspond to a number of bits in a transport block.

More particularly, for instance, the number of resource blocks $N_{PRB}$ may be mapped to a column index $N'_{PRB}$, which may be given by the formula $N'_{PRB}=\alpha*N_{PRB}$ (with certain floor(•) and max(•) operations), where $\alpha=0.75$ or 0.375 for special subframes in time-division duplexing (TDD), in which case $\alpha$ is used as a scaling factor, and $\alpha=1$ otherwise. The MCS index is mapped to a row index $I_{TBS}$, given by a table in the 3GPP standard specifications. The TBS may be determined from a lookup table, using the column index $N'_{PRB}$ and the row index $I_{TBS}$ as inputs.

According to the present aspects, the above-described techniques for uplink resource allocation and TBS determination for LTE over licensed spectrum (e.g., not LTE-U) may be adjusted in order to satisfy regulatory requirements when LTE is used over unlicensed spectrum (e.g., LTE-U). As such, and in an aspect, uplink resource allocation (which also may be referred to as PUSCH resource assignment) may be based on a multi-cluster SC-FDMA scheme. As an example, such a scheme may include RB-level interleaving using a minimum granularity of 10 RBs in order to meet the 80% occupancy needed to satisfy the regulations for LTE use over unlicensed spectrum (e.g., LTE-U). In one example, up to 10 PUSCHs may be multiplexed in a 20 Megahertz (MHz) system in order to allocate 91 RBs (16.4 MHz), which is more than 80% of the 100 RBs (18 MHz) that are usable within the channel having a 20 MHz nominal bandwidth. With this concept as a basis, and according to the present aspects, uplink resource allocation and TBS determination may be designed for use in LTE-U.

Referring to FIG. 1, an LTE network architecture 100 may include aspects configured for uplink resource allocation and transport block size determination over unlicensed spectrum. The LTE network architecture 100 may be referred to as an Evolved Packet System (EPS) 100. The EPS 100 may include one or more user equipment (UE), collectively referred to as UE 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a base transceiver station, a radio base station, a radio transceiver, a macro cell, a small cell, a femtocell, a pico cell, a transceiver function, a basic service set (BSS), an extended service set (ESS), or some other suitable terminology. The eNB 106 provides an access point to the EPC 110 for UE 102.

Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, a device for Internet-of-Things, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Due to the constraint that uplink resource allocation granularity has a coarse granularity in order to meet the 80% occupancy, as described herein, some adjustment of TBS determination is necessary. Assuming a 10 RB interlace size, according to the LTE over licensed spectrum (e.g., not LTE-U) scheme, only TBSs corresponding to every 10th RB (e.g., at RB 10, 20, 30, etc.) could be determined. However, if particular data to be transmitted are very small (e.g., only requiring a resource of 1 RB from link perspective), it is unnecessary to require that 10 RBs be used to transport that particular data. In addition, using a scaling factor, such as, for example, a, as described herein with respect to the standardized LTE resource allocation and TBS determination, may not be enough to properly adjust the TBS in such a scenario because, for example, it does not take into account the actual resource allocation when selecting the TBS.

As such, and in an aspect, TBS determination may be made based on uplink resource allocation size, MCS index, and an offset parameter. In the aspect, UE 102 includes coefficient determination component 131 configured to receive at least one indicated coefficient 152 via DCI (not shown) and determine at least one coefficient 154 based on a corresponding one of the at least one indicated coefficient 154 and some type of a coefficient mapping.

In an aspect, where the at least one coefficient 154 includes an offset parameter ($\Delta$) and/or a scaling factor ($\alpha$), coefficient determination component 131 may include offset parameter determination component 133 and/or scaling factor determination component 135. Offset parameter determination component 133 may be configured to determine an offset parameter ($\Delta$) based on an indicated offset parameter (indicated $\Delta$), which is provided to UE 102 by the network via a DCI (not shown) or other signaling approaches. Scaling factor determination component 135 may be configured to determine a scaling factor ($\alpha$) based on an indicated scaling factor (indicated $\alpha$), which is also provided to the UE 102 by the network via a DCI (not shown) or other signaling approaches.

In an aspect, the offset parameter ($\Delta$) is a parameter dynamically indicated by the uplink DCI. Assuming the use of 4-bits to indicate the value of the offset parameter ($\Delta$), Table 1 shows a possible mapping between the indicated offset parameter (indicated $\Delta$) (e.g., 4 bits) provided by the DCI and the offset parameter ($\Delta$) to be used in a formula to determine a TBS column index ($N'_{PRB}$) (which is described in more detail below). Offset parameter determination component 133 may be configured to use such a table (as in the example of Table 1) to determine the offset parameter ($\Delta$) based on the indicated offset parameter (indicated $\Delta$). The non-limiting example of Table 1 assumes a 10 RB interlace, such that the offset parameter ($\Delta$) can have a value of 0 to 9 and, as such, TBS column index ($N'_{PRB}$) can have a corresponding value of 1 to 10. For some special subframes (e.g., a subframe where only a portion of the subframe can be used for uplink transmissions e.g. in a subframe containing clear channel assessment (CCA) exempt transmissions (CET)), where a TBS of fewer than 10 RBs may be determined, some of the entries for $\Delta$ may be invalid. For example, if the scaling factor ($\alpha$)=0.5, the offset parameter ($\Delta$) values may be 0 to 4, with 5 to 9 being invalid.

| Indicated $\Delta$ | Value of $\Delta$ |
| --- | --- |
| 0000 | 0 |
| 0001 | 1 |
| 0010 | 2 |
| 0011 | 3 |
| 0100 | 4 |
| 0101 | 5 |
| 0110 | 6 |
| 0111 | 7 |
| 1000 | 8 |
| 1001 | 9 |
| 1010-1111 | reserved |

Table 1 Shows a Mapping Between a 4-Bit DCI-Indicated $\Delta$ and a Corresponding $\Delta$ Value In an aspect, scaling factor ($\alpha$) is a parameter that depends on subframe type. For a regular subframe, $\alpha$=1. For special subframes or CET, $\alpha$<1, such that, in one non-limiting example, $\alpha$=0.5 if an uplink transmission is done in one slot. Two or more values of a may be chosen depending on the fraction of a subframe available for uplink transmission. Scaling factor determination component 135 may be configured to determine the type of subframe and, based thereon, determine the scaling factor ($\alpha$).

Coefficient determination component 131 may be configured to provide the determined offset parameter ($\Delta$) and determined scaling factor ($\alpha$), as at least one coefficient 154, to TBS column index calculation component 141.

In the aspect, TBS determination is based on the offset parameter ($\Delta$) and the scaling factor ($\alpha$). TBS determination can also be based on subframe type, such as, for example, a different TBS may be determined for regular subframes, special subframes, and CET. In particular, for LTE-U, TBS column index calculation component 141 may be configured to determine a TBS column index ($N'_{PRB}$) based on the at least one coefficient 154—offset parameter ($\Delta$) and scaling factor ($\alpha$)—and the formula $N'_{PRB}=\max\{\text{floor}(\alpha*N_{PRB})-\Delta, 1\}$, where $N_{PRB}$ is a number of resource blocks (RBs) needed to transmit data 129, which UE 102 has determined is ready for transmission and, as such, is provided to transmitter 149. $N_{PRB}$ 162 may be provided to TBS column index calculation component 141 by a data-related component (not shown). As such, the column index $N'_{PRB}$ may substantially cover all possible column entries, and hence all possible TBSs. TBS column index calculation component 141 may be configured to provide the determined TBS column index ($N'_{PRB}$) 156 to TBS determination component 145.

In another aspect, TBS for LTE-U may be determined based on an adjustment factor A having a value that depends on the resource allocation size and/or subframe type to be used for transmission of data 129. In the aspect, coefficient determination component 131 may include adjustment factor determination component 137 configured to determine the adjustment factor (A) depending on subframe type and can be based on indicated adjustment factor (indicated A) provided by the network as part of the DCI (not shown). Assuming the use of 4-bits by the DCI to indicate A, Table 2 shows a possible mapping between DCI-indicated A and (1) a value of A for a normal subframe, and (2) a value of A for a special subframe and/or CET.

| Indicated A | Value of A in regular UL subframes | Value of A in special subframes and CET |
|---|---|---|
| 0000 | 1 | 0.5 |
| 0001 | (NPRB-1)/NPRB | (0.5*NPRB-1)/NPRB/2 |
| 0010 | (NPRB-2)/NPRB | (0.5*NPRB-2)/NPRB/2 |
| 0011 | (NPRB-3)/NPRB | (0.5*NPRB-3)/NPRB/2 |
| 0100 | (NPRB-4)/NPRB | (0.5*NPRB-4)/NPRB/2 |
| 0101 | (NPRB-5)/NPRB | reserved |
| 0110 | (NPRB-6)/NPRB | reserved |
| 0111 | (NPRB-7)/NPRB | reserved |
| 1000 | (NPRB-8)/NPRB | reserved |
| 1001 | (NPRB-9)/NPRB | reserved |
| 1010-1111 | Reserved | reserved |

Table 2 Shows a Mapping Between a 4-Bit DCI-Indicated A and Corresponding A Values for Normal Subframes and Special Subframes and/or CET Coefficient determination component 131 may be configured to provide the determined adjustment factor A, as at least one coefficient 154, to TBS column index calculation component 141. In the aspect, TBS column index calculation component 141 may be configured to determine the TBS column index $N'_{PRB}$ based on A and the formula $N'_{PRB} = \max\{\text{floor}(A(N_{PRB})*N_{PRB}), 1\}$, where $N_{PRB}$ is a number of resource blocks (RBs) needed to transmit data 129, which UE 102 has determined is ready for transmission and, as such, is provided to transmitter 149. $N_{PRB}$ 162 may be provided to TBS column index calculation component 141 by a data-related component (not shown). As such, the column index $N'_{PRB}$ may substantially cover all possible column entries, and hence all possible TBSs. TBS column index calculation component 141 may be configured to provide the determined TBS column index ($N'_{PRB}$) 156 to TBS determination component 145.

In any case (e.g., regardless of the components included in coefficient determination component 131 and the formula used to determine the TBS column index $N'_{PRB}$ by TBS column index calculation component 141), UE 102 include TBS determination component 145 configured to receive the TBS column index ($N'_{PRB}$) 156 and apply it to a TBS table 147 (having column and row indices that identify a particular TBS) to determine the TBS. In an aspect, TBS determination component 145 also may be configured to apply a modulated coding scheme (MCS) row index ($I_{TBS}$) to the TBS table 147 in order to have both a column index and row index to identify the appropriate TBS. In the aspect, the MCS row index ($I_{TBS}$) may be determined based on a mapping of an MCS index assigned to the physical uplink shared channel (PUSCH) to the MCS row index ($I_{TBS}$) according to the 3GPP standards. TBS determination component 145 may be configured to provide the determined TBS 158 to transmitter 149, which may be configured to transmit data 129 to the network according to TBS 158.

In an aspect (not shown), in LTE over licensed spectrum (e.g., not LTE-U), aperiodic channel quality indicator (CQI)-only transmissions (e.g., transmissions on the uplink without any uplink data over uplink-share channel (UL-SCH)) on PUSCH may be indicated to UE 102, which is transmitting on the uplink to one of eNodeB 106 and/or other eNodeBs 108, by, for example, indicating that MCS index is 29, a CQI request bit is set to 1, and $N_{PRB}$ is less than or equal to 4 (e.g., $N_{PRB} \leq 4$).

In LTE-U, and in an aspect (not shown), eNodeB 106 and/or other eNodeBs 108 may indicate a CQI-only transmission to UE 102 in a manner similar to that used for LTE over licensed spectrum. For example, when MCS index=29, CQI request bit is set to 1, and $N_{PRB} \leq 10$, the UE 102 may be informed to make an aperiodic CQI-only transmission. In another aspect, one of eNodeB 106 and/or other eNodeBs 108 may indicate a CQI-only transmission to UE 102 using one bit of the 4-bit offset parameter ($\Delta$), which was described above. For example, Table 3 shows how the CQI-only transmission may be indicated using the 4-bit offset parameter ($\Delta$).

| Indicated $\Delta$ | Value of $\Delta$ |
|---|---|
| 0001 | 1 |
| 0010 | 2 |
| 0011 | 3 |
| 0100 | 4 |
| 0101 | 5 |
| 0110 | 6 |
| 0111 | 7 |
| 1000 | 8 |
| 1001 | 9 |
| 1010 | Aperiodic CQI-only transmission |
| 1011-1111 | reserved |

Table 3 Shows the 4-Bit $\Delta$ being Used to Indicate an Aperiodic CQI-Only Transmission LTE-U also may be used for multiple-input, multiple-output (MIMO) communications, to which DCI format 4 applies. As such, and in an aspect (not shown), the two codewords needed for MIMO may have the same offset parameter ($\Delta$) and/or scaling factor ($\alpha$) values, as described herein. In another aspect, the offset parameter ($\Delta$) and/or scaling factor ($\alpha$) values used for the two codewords may be different from one another. In yet another aspect, one of the offset parameter ($\Delta$) and scaling factor ($\alpha$) values may be the same for both codewords, while the other of the offset parameter ($\Delta$) and scaling factor ($\alpha$) values may be different for each of the two codewords (e.g., same offset parameter ($\Delta$) values for two codewords, different scaling factor ($\alpha$) values for the two codewords).

In an aspect, uplink resource allocation for LTE over unlicensed spectrum (e.g., LTE-U) may be performed using a bitmap-based approach, via, for example, a bitmap determination component (not shown in FIG. 1). In one, non-limiting example, if each interlace has 10 interleaved RBs and there are 10 interlaces in a 20 MHz system, a 10-bit bitmap, as shown below in Table 4, may be used to indicate uplink resource allocation for LTE-U. Slot hopping may not be supported.

| Interlace | RBs |
|---|---|
| 0 | 0, 10, 20, . . . , 90 |
| 1 | 1, 11, 21, . . . , 91 |
| 2 | 2, 12, 22, . . . , 92 |
| 3 | 3, 13, 23, . . . , 93 |
| 4 | 4, 14, 24, . . . , 94 |
| 5 | 5, 15, 25, . . . , 95 |
| 6 | 6, 16, 26, . . . , 96 |
| 7 | 7, 17, 27, . . . , 97 |
| 8 | 8, 18, 28, . . . , 98 |
| 9 | 9, 19, 29, . . . , 99 |

Table 4 Shows a 10-Bit Bitmap Between Interlaces and RBs

In an aspect, additional flexibility in the bitmap-based approach may be possible. For example, this bitmap-based approach supports resource allocation of integer multiples of the interlace size, such as, in the present example, for an interlace of 10, every 10th RB may be selected. However, finer granularity (e.g., less than 10) may be used if there is at least already one full interlace assigned. In one example, the bitmap may support one interlace (e.g., every 10 RBs) plus some combination of half interlaces (e.g., every 5 RBs). However, in some cases, the benefits of such additional flexibility may outweigh the detriment of any additional signaling overhead that would be required to support the flexibility.

In LTE over licensed spectrum (e.g., not LTE-U) in a 20 MHz system, using DCI format 0 for uplink resource allocation may include 1-bit for a slot hopping flag plus 13 bits for resource allocation, for a total of 14 bits. Using DCI format 4, all 14 bits may be used for resource allocation as slot hopping is not supported. In LTE-U, 10 bits are needed for resource allocation according to the bitmap-based approach as described herein. As such, there is a 4-bit difference between uplink resource allocation in LTE and uplink resource allocation in LTE-U. As such, in LTE-U, these extra 4 bits (which are not needed for uplink resource allocation) may be used for some other data and/or purpose. In one non-limiting example, the extra 4 bits may be used for downlink resource allocation in LTE-U.

Figure 2:
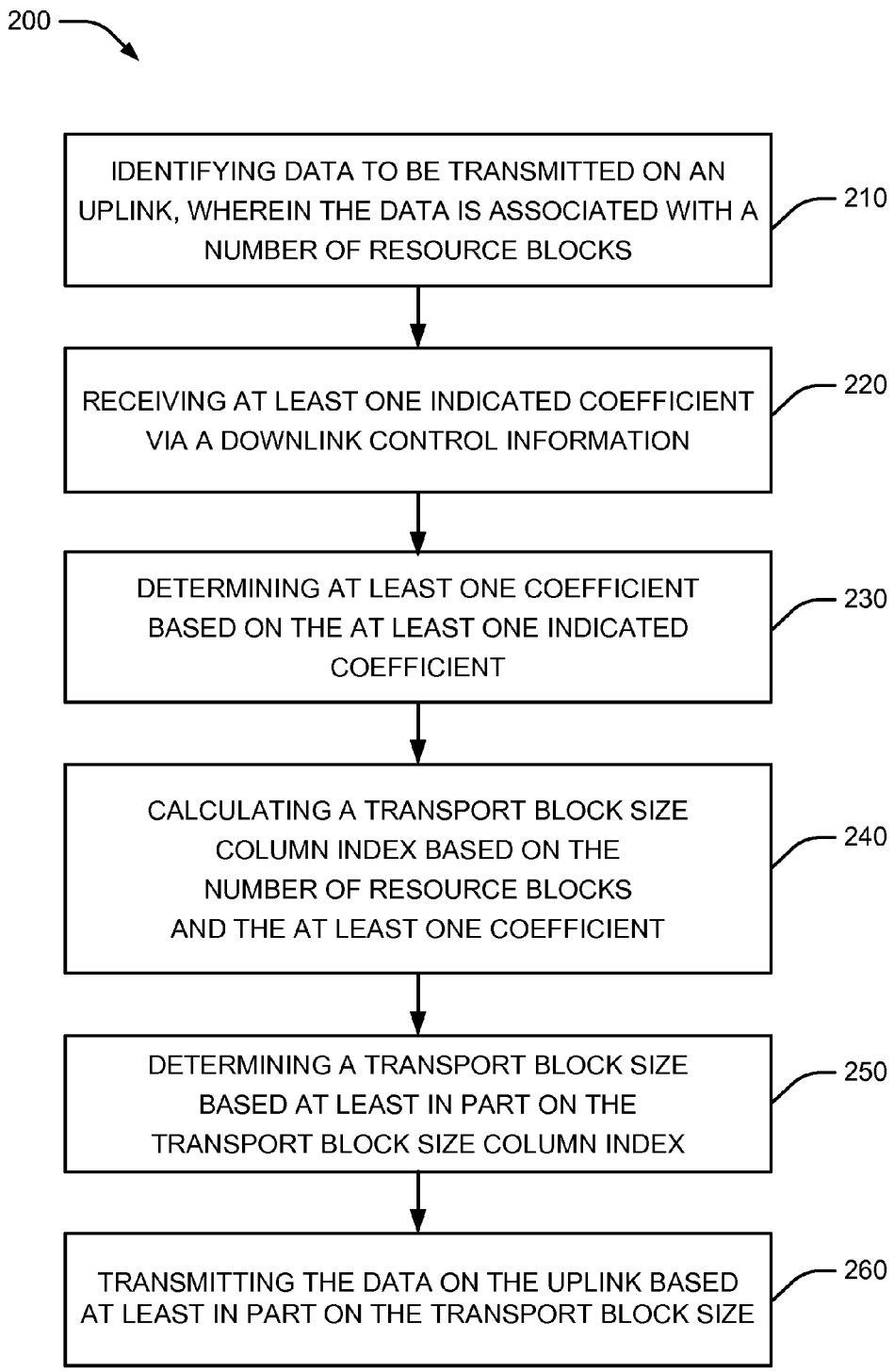
FIG. 2 is a flow chart of a method for determining transport block size and allocating uplink resources in accordance with the present aspects, e.g., according to FIG. 1.

Referring to FIG. 2, aspects of a method 200 for determining transport block size (TBS) and, in an aspect, allocating uplink resources may be performed by UE 102 of FIG. 1. Method 200 is shown and described as a series of acts for purposes of simplicity of explanation. However, it is to be understood and appreciated that the method (and further methods related thereto) are not limited by the order of acts, as some acts may, in accordance with one or more aspects, occur in different orders and/or concurrently with other acts from that shown and described herein. For example, it is to be appreciated that the method may alternatively be represented as a series of interrelated states or events, such as in a state diagram. Moreover, not all illustrated acts may be required to implement a method in accordance with one or more features described herein.

For example, coefficient determination component 131 (which may include, in various aspects, offset parameter determination component 133, scaling factor determination component 135, and/or adjustment factor determination component 137), TBS column index calculation component 141, TBS determination component 145, and/or transmitter 149 of FIG. 1 may be configured to perform aspects of the method 200.

At 210, the method 200 includes identifying data to be transmitted on an uplink, wherein the data is associated with a number of resource blocks ($N_{PRB}$). For example, UE 102 via a data identification (or other data-related) component (not shown in FIG. 1) may be configured to identify data 129 as data ready for transmission on an uplink. In some aspects, the uplink may include or alternatively be referred to an uplink channel configured to facilitate transmission of data from a UE to a network entity (e.g., eNodeB). Data 129 may be associated with a particular size and, as such, a number of resource blocks ($N_{PRB}$), to be transmitted on the uplink. As such, data 129 may be communicated to transmitter 149 for transmission to the network upon a determination of the appropriate TBS for such transmission (as described herein).

At 220, the method 200 includes receiving at least one indicated coefficient via a downlink control information (DCI). For example, coefficient determination component 131 may receive at least one indicated coefficient 152 from the network via or based on a DCI (not shown). In an aspect, one of the at least one indicated coefficient 152 is an indicated offset parameter (indicated $\Delta$) and one of the at least one indicated coefficient is an indicated scaling factor (indicated $\alpha$). In another aspect, the at least one indicated coefficient 152 is an indicated adjustment factor (indicated $\Delta$).

At 230, the method 200 includes determining at least one coefficient based on the at least one indicated coefficient. In an aspect, offset parameter determination component 133 may be configured to determine an offset parameter ($\Delta$) based on the indicated offset parameter (indicated $\Delta$) according to a mapping, such as, for example, the mapping shown in Table 1. In an aspect, scaling factor determination component 135 may be configured to determine a scaling factor ($\alpha$) based on the indicated scaling factor (indicated $\alpha$) depending on a type of subframe with which data 129 will be transmitted. Scaling factor determination component 135 may be configured to determine the type of subframe and, based thereon, determine the scaling factor ($\alpha$). For example, for a regular subframe, scaling factor determination component 135 may determine $\alpha=1$. For example, for special subframes or CET, scaling factor determination component 135 may determine $\alpha<1$, such that, in one non-limiting example, $\alpha=0.5$ if an uplink transmission is done in one slot. In any event, coefficient determination component 131 may be configured to provide the at least one coefficient 154 to TBS column index calculation component 141.

At 240, the method 200 includes calculating a transport block size column index ($N'_{PRB}$) based on the number of resource blocks ($N_{PRB}$) and the at least one coefficient. For example, TBS column index calculation component 141 may be configured to receive the at least one coefficient 154 (determined by coefficient determination component 131 based on the at least one indicated coefficient 152). TBS column index calculation component 141 also may be configured to receive a number of resource blocks ($N_{PRB}$)

associated with data 129. Based thereon, TBS column index calculation component 141 may be configured to calculate a TBS column index (N'$_{PRB}$).

In an aspect where one of the at least one coefficient 154 is an offset parameter (Δ) and one of the at least one coefficient 154 is a scaling factor (α), TBS column index calculation component 141 may be configured to calculate the transport block size column index (N'$_{PRB}$) based on the formula N'PRB=max{floor(α*NPRB)−Δ, 1}. In an aspect where the at least one coefficient 154 is an adjustment factor (A), TBS column index calculation component 141 may be configured to calculate the TBS column index (N'$_{PRB}$) based on the formula N'PRB=max{floor(α(NPRB)*NPRB), 1}. In any event, TBS column index calculation component 141 may be configured to provide the calculated TBS column index (N'$_{PRB}$) 156 to TBS determination component 145.

At 250, the method 200 includes determining a transport block size based at least in part on the transport block size column index. For example, TBS determination component 145 may be configured to receive the TBS column index (N'$_{PRB}$) 156 from TBS column index calculation component 141 and apply it to a TBS table 147 to determine the TBS. In an aspect, TBS determination component 145 also may be configured to apply a modulated coding scheme (MCS) row index (I$_{TBS}$) to the TBS table 147 in order to have both a column index and row index to identify the appropriate TBS. In the aspect, the MCS row index (I$_{TBS}$) may be determined based on a mapping of an MCS index assigned to the physical uplink shared channel (PUSCH) to the MCS row index (I$_{TBS}$) according to the 3GPP standards. TBS determination component 145 may be configured to provide TBS 158.

At 260, the method 200 includes transmitting the data on the uplink based on the transport block size. For example, transmitter 149 may be configured to receive data 129 (as described above) and also receive TBS 158 from TBS determination component 145. Transmitter 149 may be configured to transmit data 129 on the uplink to the network according to TBS 158.

In an aspect (not shown), the method 200 also may include transmitting the data 129 (via transmitter 149) according to a multiple-input multiple-output (MIMO) scheme having two codewords, and wherein the at least one coefficient 154 need not be the same for each of the two codewords.

In an aspect (not shown), the method 200 also may include determining a number of interlaces (I) based on a system bandwidth, determining a number of interleaved resource blocks (RBs) based on the system bandwidth, generating a bitmap based on the number of interlaces (I) and the number of interleaved resource blocks (RBs), and allocating resources based on the bitmap.

Figure 3:
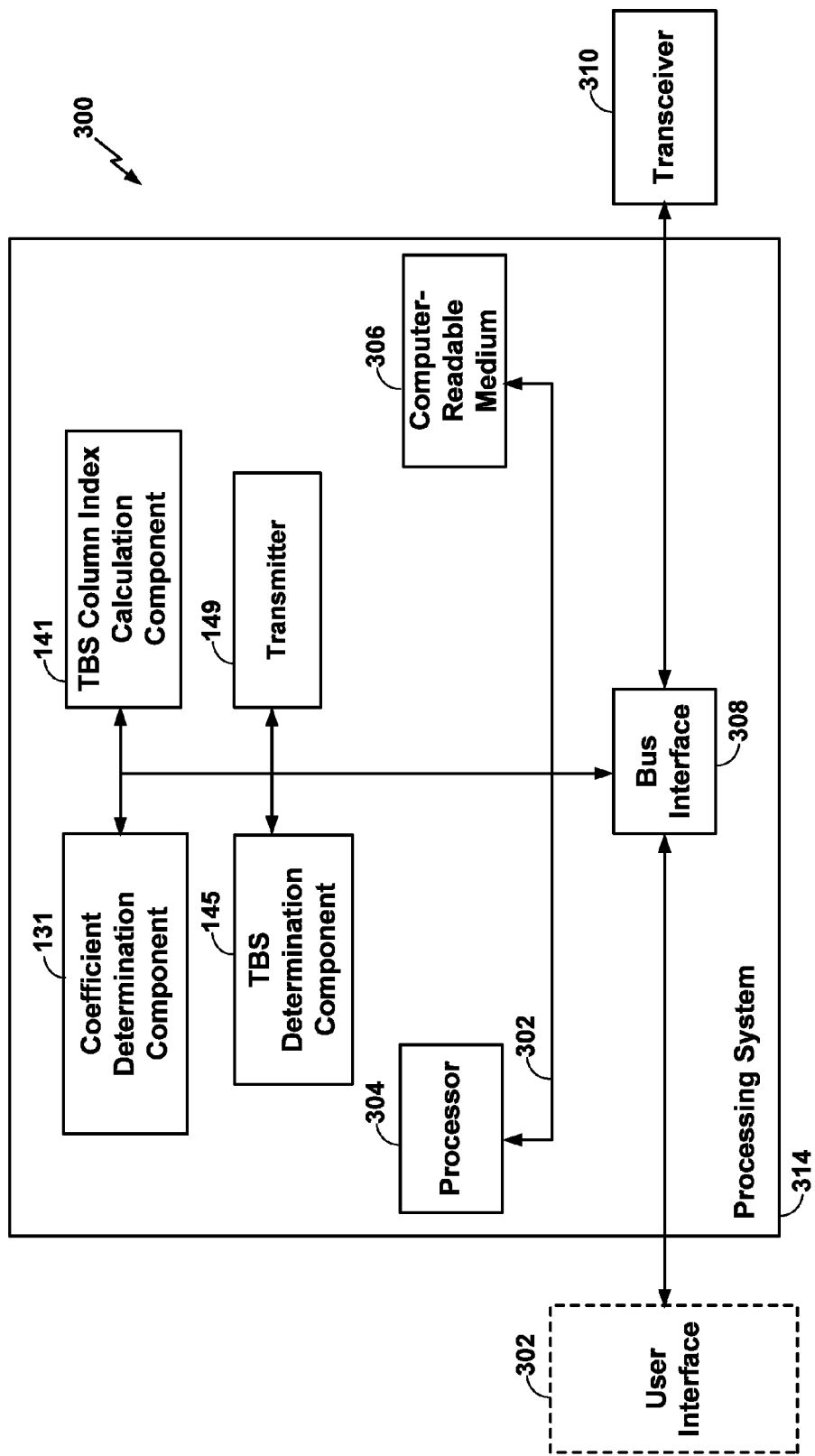
FIG. 3 is a diagram illustrating an example of a hardware implementation for an apparatus employing a processing system, having aspects configured for uplink resource allocation and transport block size determination over unlicensed spectrum, and in accordance with the present aspects, e.g., according to FIG. 1.

Referring to FIG. 3, an example of a hardware implementation for an apparatus 300 employing a processing system 314 includes aspects configured for uplink resource allocation and transport block size determination over unlicensed spectrum. For example, the apparatus 300 may be UE 102 of FIG. 1. In this example, the processing system 314 may be implemented with a bus architecture, represented generally by the bus 302. The bus 302 may include any number of interconnecting buses and bridges depending on the specific application of the processing system 314 and the overall design constraints. The bus 302 links together various circuits including one or more processors, represented generally by the processor 304, and computer-readable media, represented generally by the computer-readable medium 306. The bus 302 also may link various other circuits such as timing sources, peripherals, voltage regulators, and power management circuits, which are well known in the art, and therefore, will not be described any further. According to the present aspects, in an example where apparatus 300 is UE 102 of FIG. 1, the bus 302 also may link coefficient determination component 131, TBS column index calculation component 141, TBS determination component 145, and transmitter 149.

A bus interface 308 provides an interface between the bus 302 and a transceiver 310. The transceiver 310 provides a means for communicating with various other apparatus over a transmission medium. Depending upon the nature of the apparatus, a user interface 312 (e.g., keypad, display, speaker, microphone, joystick) may also be provided.

The processor 304 is responsible for managing the bus 302 and general processing, including the execution of software stored on the computer-readable medium 306. The software, when executed by the processor 304, causes the processing system 314 to perform the various functions described herein including, for example, uplink resource allocation and TBS determination over unlicensed spectrum, for any particular apparatus. The computer-readable medium 306 may also be used for storing data that is manipulated by the processor 304 when executing software.

Figure 4:
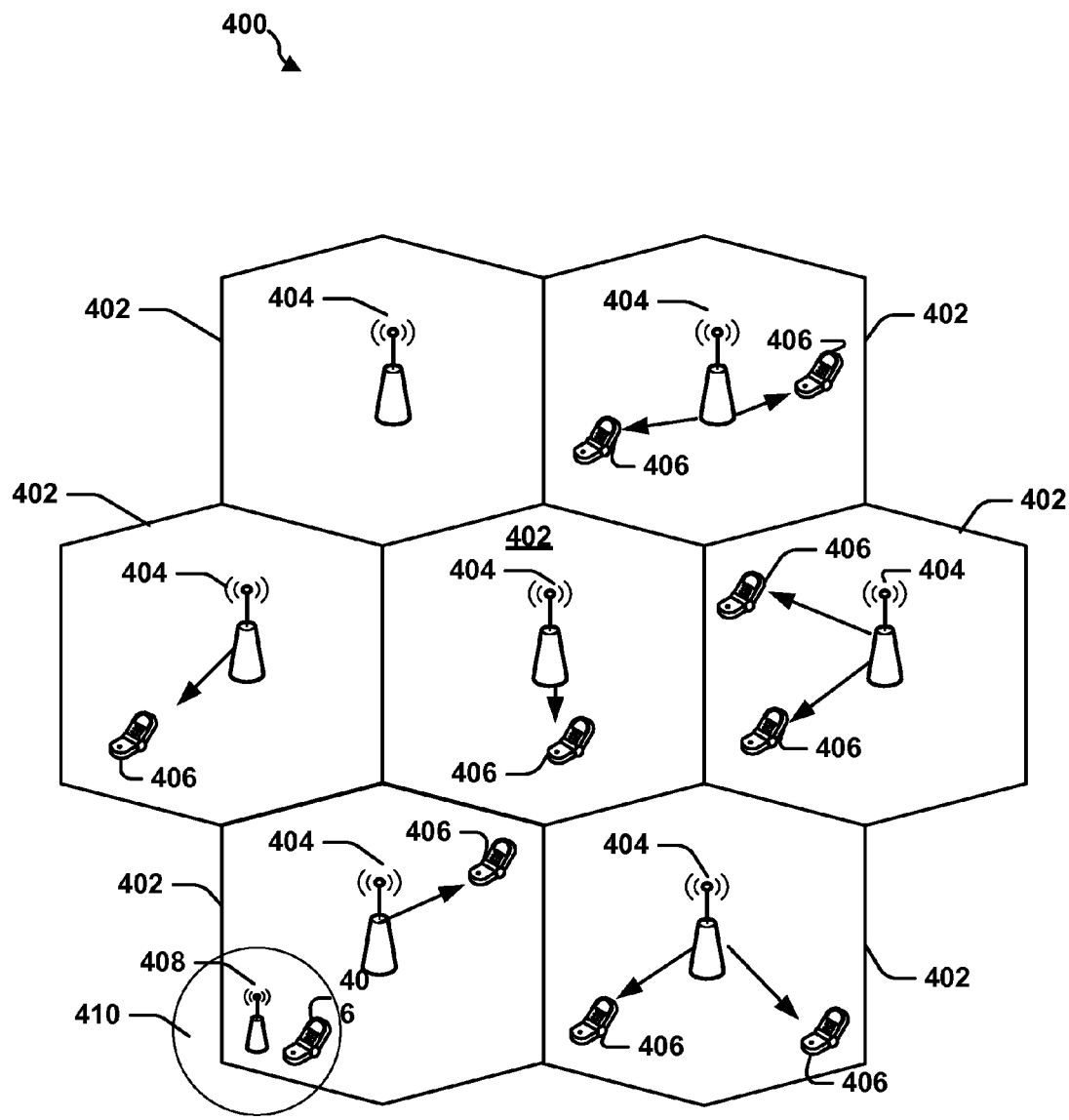
FIG. 4 is a diagram illustrating an example of an access network having aspects configured for uplink resource allocation and transport block size determination over unlicensed spectrum in accordance with the present aspects, e.g., according to FIG. 1.

FIG. 4 is a diagram illustrating an example of an access network 400 in an LTE network architecture, including aspects configured for uplink resource allocation and transport block size determination over unlicensed spectrum. In this example, the access network 400 is divided into a number of cellular regions (cells) 402. One or more lower power class eNBs 408, which may be eNB 106 or other eNBs 108 of FIG. 1, may have cellular regions 410 that overlap with one or more of the cells 402. The lower power class eNB 408 may be a femto cell (e.g., home eNB (HeNB)), pico cell, micro cell, or remote radio head (RRH). The macro eNBs 404, which may be eNB 106 and/or other eNBs 108 of FIG. 1, are each assigned to a respective cell 402 and are configured to provide an access point to the EPC 110 for all the UEs 406, which may be UE 102 of FIG. 1, in the cells 402. There is no centralized controller in this example of an access network 400, but a centralized controller may be used in alternative configurations. The eNBs 404 are responsible for all radio related functions including radio bearer control, admission control, mobility control, scheduling, security, and connectivity to the SGW 116.

The modulation and multiple access scheme employed by the access network 400 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (Wi-MAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 404 may have multiple antennas supporting MIMO technology. The use of MIMO technology enables the eNBs 404 to exploit the spatial domain to support spatial multiplexing, beamforming, and transmit diversity. Spatial multiplexing may be used to transmit different streams of data simultaneously on the same frequency. The data steams may be transmitted to a single UE 406 to increase the data rate or to multiple UEs 406, which may be the same as, or similar to, UE 102 of FIG. 1, to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 406 with different spatial signatures, which enables each of the UE(s) 406 to recover the one or more data streams destined for that UE 406. On the UL, each UE 406 transmits a spatially precoded data stream, which enables the eNB 404 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 5:
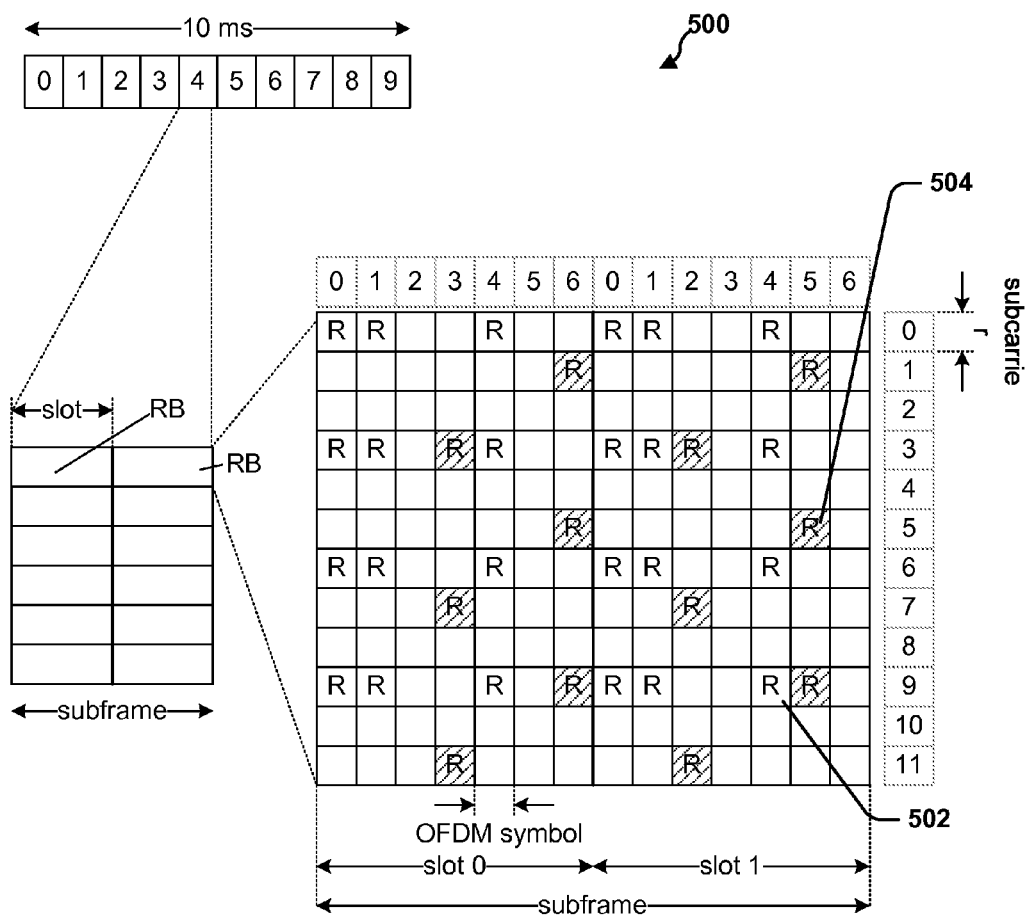
FIG. 5 is a diagram illustrating an example of a DL frame structure in LTE in accordance with the present aspects, e.g., according to FIG. 1.

FIG. 5 is a diagram 500 illustrating an example of a DL frame structure in LTE. A frame (10 ms) may be divided into 10 equally sized sub-frames. Each subframe may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 502, 504, include DL reference signals (DL-RS). The DL-RS include Cell-specific RS (CRS) (also sometimes called common RS) 502 and UE-specific RS (UE-RS) 504. UE-RS 504 are transmitted only on the resource blocks upon which the corresponding physical DL shared channel (PDSCH) is mapped. The number of bits carried by each resource element depends on the modulation scheme. Thus, the more resource blocks that a UE (e.g., UE 102 of FIG. 1) receives and the higher the modulation scheme, the higher the data rate for the UE.

Figure 6:
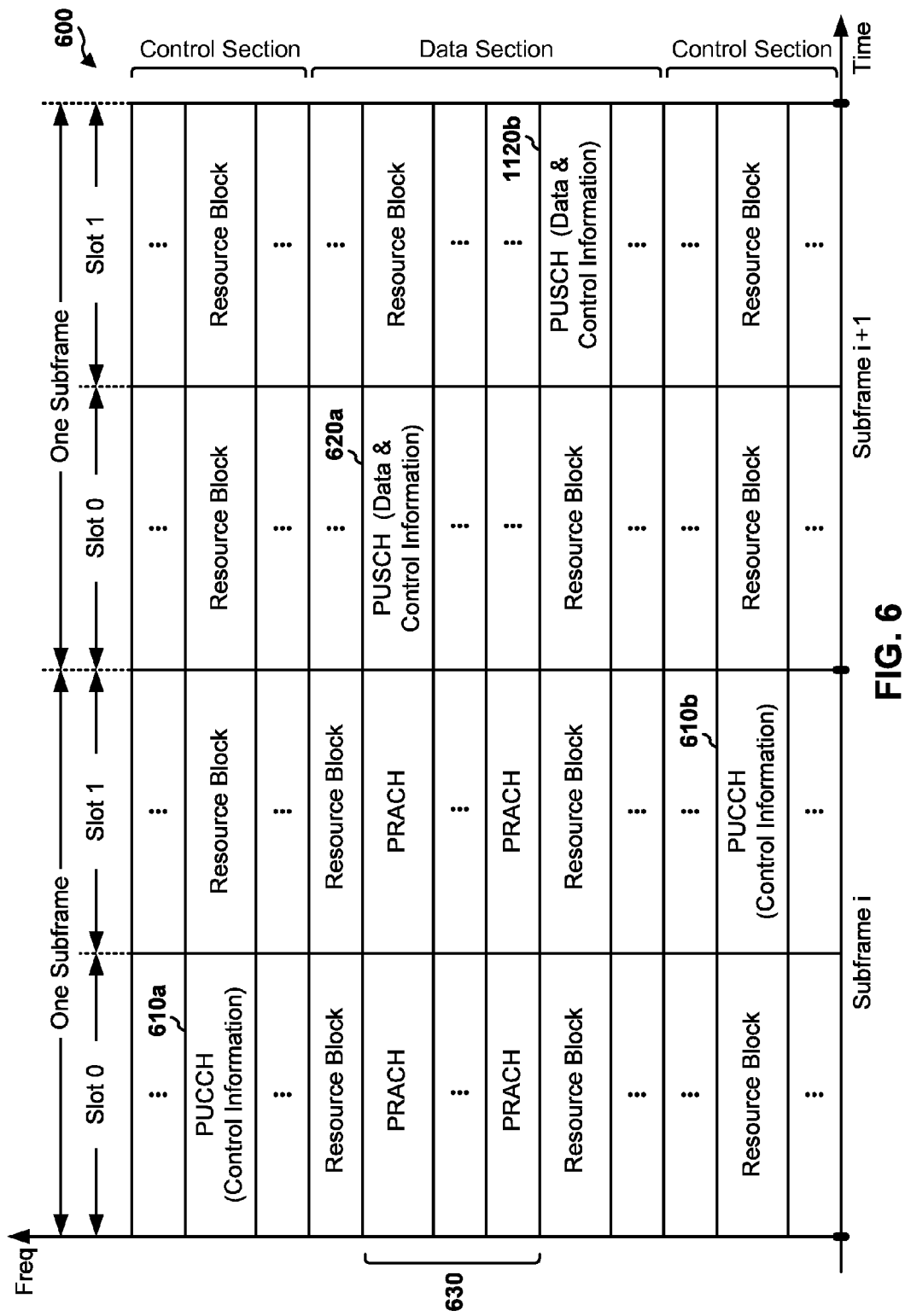
FIG. 6 is a diagram illustrating an example of an UL frame structure in LTE in accordance with the present aspects, e.g., according to FIG. 1.

FIG. 6 is a diagram 600 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE (e.g., UE 102 of FIG. 1) may be assigned resource blocks 610a, 610b in the control section to transmit control information to an eNB. The UE may also be assigned resource blocks 620a, 620b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 630. The PRACH 630 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 7:
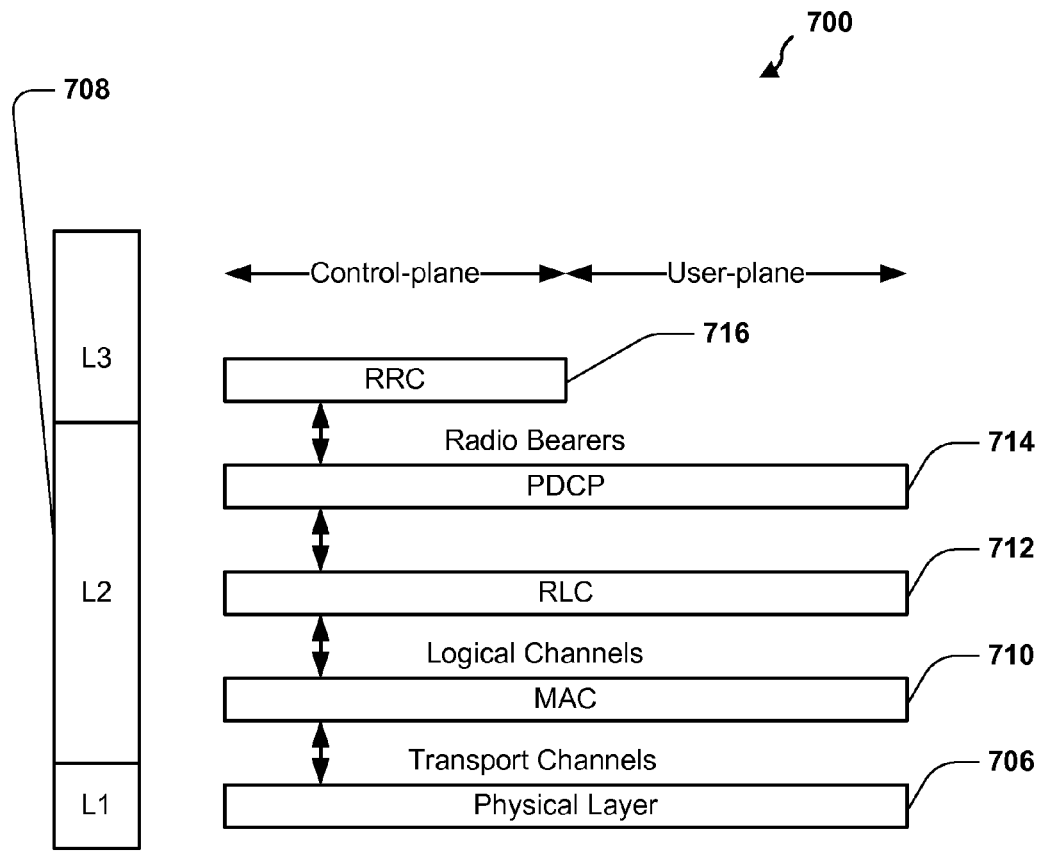
FIG. 7 is a diagram illustrating an example of a radio protocol architecture for user and control planes in accordance with the present aspects, e.g., according to FIG. 1.

FIG. 7 is a diagram 700 illustrating an example of a radio protocol architecture for the user and control planes in LTE. The radio protocol architecture for a UE, such as, for example, UE 102 of FIG. 1, and an eNB, such as, for example, eNB 106 and/or other eNBs 108 of FIG. 1, is shown with three layers: Layer 1, Layer 2, and Layer 3. Layer 1 (L1 layer) is the lowest layer and implements various physical layer signal processing functions. The L1 layer will be referred to herein as the physical layer 706. Layer 2 (L2 layer) 708 is above the physical layer 706 and is responsible for the link between the UE and eNB over the physical layer 706.

In the user plane, the L2 layer 708 includes a media access control (MAC) sublayer 710, a radio link control (RLC) sublayer 712, and a packet data convergence protocol (PDCP) 714 sublayer, which are terminated at the eNB on the network side. Although not shown, the UE may have several upper layers above the L2 layer 708 including a network layer (e.g., IP layer) that is terminated at the PDN gateway 118 on the network side, and an application layer that is terminated at the other end of the connection (e.g., far end UE, server, etc.).

The PDCP sublayer 714 provides multiplexing between different radio bearers and logical channels. The PDCP sublayer 714 also provides header compression for upper layer data packets to reduce radio transmission overhead, security by ciphering the data packets, and handover support for UEs between eNBs. The RLC sublayer 712 provides segmentation and reassembly of upper layer data packets, retransmission of lost data packets, and reordering of data packets to compensate for out-of-order reception due to hybrid automatic repeat request (HARQ). The MAC sublayer 710 provides multiplexing between logical and transport channels. The MAC sublayer 710 is also responsible for allocating the various radio resources (e.g., resource blocks) in one cell among the UEs. The MAC sublayer 710 is also responsible for HARQ operations.

In the control plane, the radio protocol architecture for the UE and eNB is substantially the same for the physical layer 706 and the L2 layer 708 with the exception that there is no header compression function for the control plane. The control plane also includes a radio resource control (RRC) sublayer 716 in Layer 3 (L3 layer). The RRC sublayer 716 is responsible for obtaining radio resources (i.e., radio bearers) and for configuring the lower layers using RRC signaling between the eNB and the UE.

Figure 8:
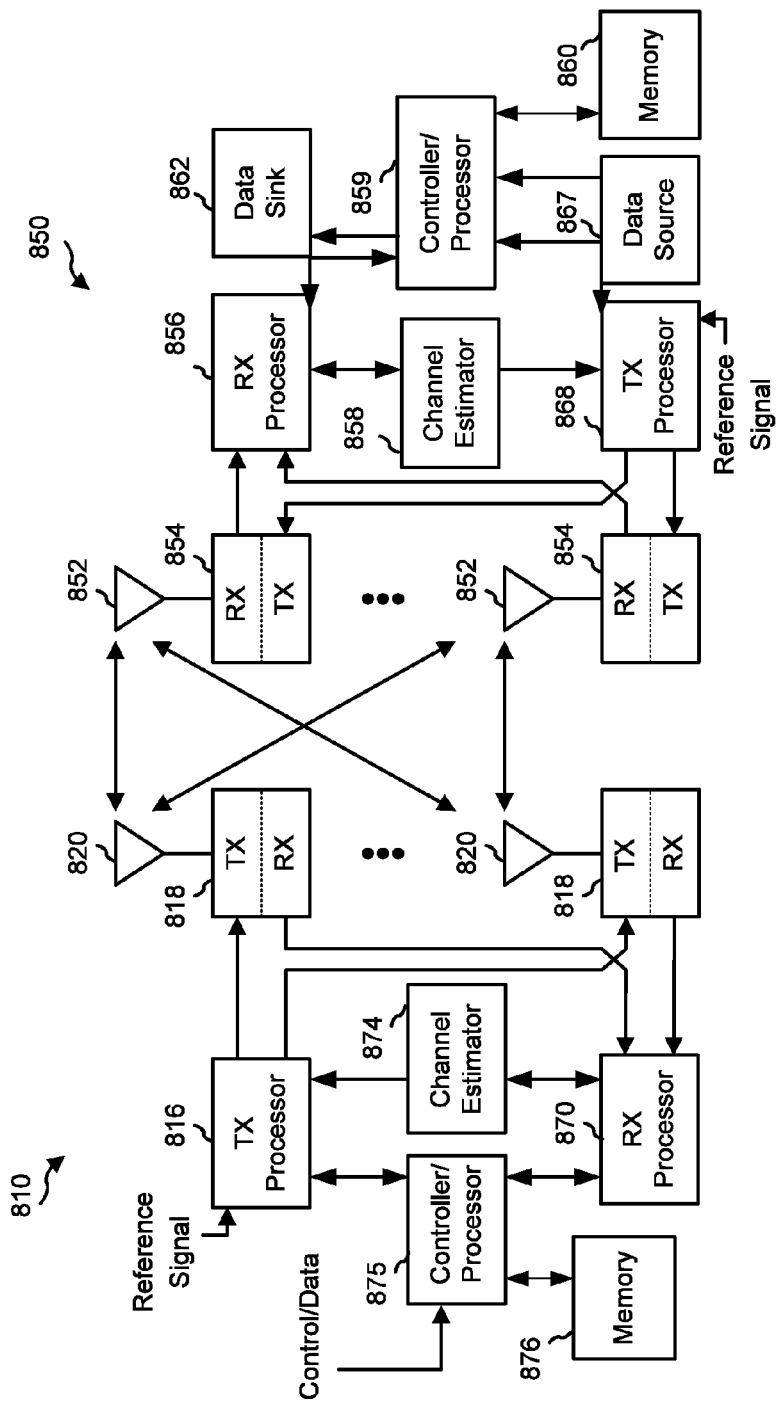
FIG. 8 is a diagram illustrating an example of an evolved Node B and user equipment in an access network, having aspects configured for uplink resource allocation and transport block size determination over unlicensed spectrum, and in accordance with the present aspects, e.g., according to FIG. 1.

FIG. 8 is a block diagram of an eNB 810 in communication with a UE 850 in an access network, including aspects configured for uplink resource allocation and transport block size determination over unlicensed spectrum. eNB 810 may be the same as, or similar to, eNB 106 and/or other eNBs 108 of FIG. 1, and UE 850 may be the same as, or similar to, UE 102 of FIG. 1 including one or more of coefficient determination component 131, TBS column index calculation component 141, and TBS determination component 145.

In the DL, upper layer packets from the core network are provided to a controller/processor 875. The controller/processor 875 implements the functionality of the L2 layer. In the DL, the controller/processor 875 provides header compression, ciphering, packet segmentation and reordering, multiplexing between logical and transport channels, and radio resource allocations to the UE 850 based on various priority metrics. The controller/processor 875 is also responsible for HARQ operations, retransmission of lost packets, and signaling to the UE 850.

The transmit (TX) processor 816 implements various signal processing functions for the L1 layer (i.e., physical layer). The signal processing functions includes coding and interleaving to facilitate forward error correction (FEC) at the UE 850 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 874 may be used to determine the coding and modulation scheme, as well as for spatial processing. The channel estimate may be derived from a reference signal and/or channel condition feedback transmitted by the UE 850. Each spatial stream is then provided to a different antenna 820 via a separate transmitter 818TX. Each transmitter 818TX modulates an RF carrier with a respective spatial stream for transmission.

At the UE 850, each receiver 854RX receives a signal through its respective antenna 852. Each receiver 854RX recovers information modulated onto an RF carrier and provides the information to the receive (RX) processor 856. The RX processor 856 implements various signal processing functions of the L1 layer. The RX processor 856 performs spatial processing on the information to recover any spatial streams destined for the UE 850. If multiple spatial streams are destined for the UE 850, they may be combined by the RX processor 856 into a single OFDM symbol stream. The RX processor 856 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 810. These soft decisions may be based on channel estimates computed by the channel estimator 858. The soft decisions are then decoded and deinterleaved to recover the data and control signals that were originally transmitted by the eNB 810 on the physical channel. The data and control signals are then provided to the controller/processor 859.

The controller/processor 859 implements the L2 layer. The controller/processor can be associated with a memory 860 that stores program codes and data. The memory 860 may be referred to as a computer-readable medium. In the UL, the controller/processor 859 provides demultiplexing between transport and logical channels, packet reassembly, deciphering, header decompression, control signal processing to recover upper layer packets from the core network. The upper layer packets are then provided to a data sink 862, which represents all the protocol layers above the L2 layer. Various control signals may also be provided to the data sink 862 for L3 processing. The controller/processor 859 is also responsible for error detection using an acknowledgement (ACK) and/or negative acknowledgement (NACK) protocol to support HARQ operations.

In the UL, a data source 867 is used to provide upper layer packets to the controller/processor 859. The data source 867 represents all protocol layers above the L2 layer. Similar to the functionality described in connection with the DL transmission by the eNB 810, the controller/processor 859 implements the L2 layer for the user plane and the control plane by providing header compression, ciphering, packet segmentation and reordering, and multiplexing between logical and transport channels based on radio resource allocations by the eNB 810. The controller/processor 859 is also responsible for HARQ operations, retransmission of lost packets, and signaling to the eNB 810.

Channel estimates derived by a channel estimator 858 from a reference signal or feedback transmitted by the eNB 810 may be used by the TX processor 868 to select the appropriate coding and modulation schemes, and to facilitate spatial processing. The spatial streams generated by the TX processor 868 are provided to different antenna 852 via separate transmitters 854TX. Each transmitter 854TX modulates an RF carrier with a respective spatial stream for transmission.

The UL transmission is processed at the eNB 810 in a manner similar to that described in connection with the receiver function at the UE 850. Each receiver 818RX receives a signal through its respective antenna 820. Each receiver 818RX recovers information modulated onto an RF carrier and provides the information to a RX processor 870. The RX processor 870 may implement the L1 layer.

The controller/processor 875 implements the L2 layer. The controller/processor 875 can be associated with a memory 876 that stores program codes and data. The memory 876 may be referred to as a computer-readable medium. In the UL, the control/processor 875 provides demultiplexing between transport and logical channels, packet reassembly, deciphering, header decompression, control signal processing to recover upper layer packets from the UE 850. Upper layer packets from the controller/processor 875 may be provided to the core network. The controller/processor 875 is also responsible for error detection using an ACK and/or NACK protocol to support HARQ operations.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM□, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

The various illustrative logics, logical blocks, modules, and circuits described in connection with the aspects and/or examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An example storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or examples, it should be noted that various changes and modifications could be made herein without departing from the scope of the described aspects and/or examples as defined by the appended claims. Furthermore, although elements of the described aspects and/or examples may be described or claimed in the singular, the plural is contemplated unless limitation to the singular is explicitly stated. Additionally, all or a portion of any aspect and/or example may be utilized with all or a portion of any other aspect and/or example, unless stated otherwise.

The invention claimed is:

1. A method of determining a transport block size for transmitting data, comprising:
    identifying data to be transmitted on an uplink over an unlicensed spectrum, wherein the data is associated with a number of resource blocks;
    receiving at least one indicated coefficient via downlink control information, wherein the at least one indicated coefficient is represented by four bits out of fourteen bits with the four bits not being needed in the downlink control information in the unlicensed spectrum for downlink resource allocation;
    determining at least one coefficient based on the at least one indicated coefficient;
    calculating a transport block size column index based on the number of resource blocks and the at least one coefficient;
    determining the transport block size based at least in part on the transport block size column index and a modulated coding scheme row index assigned to a physical uplink shared channel (PUSCH); and
    transmitting the data on the uplink over the unlicensed spectrum based at least in part on the transport block size.

2. The method of claim 1, wherein the at least one coefficient corresponds to an offset parameter, and the transport block size column index is shifted from the number of resource blocks based on the offset parameter.

3. The method of claim 1, wherein the at least one coefficient corresponds to a scaling factor, and the transport block size column index is scaled from the transport block size column index based on the scaling factor.

4. The method of claim 1, further comprising receiving a layer 3 configuration, wherein determining of the at least one coefficient is further based on the layer 3 configuration.

5. The method of claim 1, wherein determining the at least one coefficient is further based on a mapping table.

6. The method of claim 1, wherein a value range of the at least one coefficient depends on a subframe type.

7. The method of claim 6, wherein the subframe type includes one of a regular uplink subframe, a special subframe, or a subframe exempt from clear channel assessment.

8. The method of claim 1, wherein a value of the at least one coefficient depends on a portion of a subframe available for transmission on the uplink.

9. The method of claim 1, wherein the at least one coefficient corresponds to an adjustment factor, wherein the adjustment factor is a function of the number of resource blocks.

10. The method of claim 1, wherein the at least one coefficient has a value corresponding to uplink data including channel state information feedback independent of an uplink shared channel (UL-SCH).

11. The method of claim 1, wherein transmitting the data includes transmitting the data according to a multiple-input multiple-output (MIMO) scheme having two codewords, and wherein the at least one coefficient is the same for each of the two codewords.

12. The method of claim 1, wherein the at least one coefficient depends on a resource allocation granularity for transmission on the uplink.

13. The method of claim 1, further comprising:
    determining a number of interlaces based on a system bandwidth;
    determining a number of interleaved resource blocks based on the system bandwidth;
    generating a bitmap based on the number of interlaces and the number of interleaved resource blocks; and
    allocating resources based on the bitmap.

14. The method of claim 1, wherein the at least one coefficient corresponds to an offset parameter and a scaling factor.

15. A non-transitory computer readable medium storing computer executable code, comprising:
    code executable to identify data to be transmitted on an uplink over an unlicensed spectrum, wherein the data is associated with a number of resource blocks;
    code executable to receive at least one indicated coefficient via downlink control information, wherein the at least one indicated coefficient is represented by four bits out of fourteen bits with the four bits not being needed in the downlink control information in the unlicensed spectrum for downlink resource allocation;
    code executable to determine at least one coefficient based on the at least one indicated coefficient;
    code executable to calculate a transport block size column index based on the number of resource blocks and the at least one coefficient;
    code executable to determine a transport block size based at least in part on the transport block size column index and a modulated coding scheme row index assigned to a physical uplink shared channel (PUSCH); and
    code executable to transmit the data on the uplink over the unlicensed spectrum based at least in part on the transport block size.

16. An apparatus for determining a transport block size for transmitting data, comprising:

means for identifying data to be transmitted on an uplink over an unlicensed spectrum, wherein the data is associated with a number of resource blocks;

means for receiving at least one indicated coefficient via downlink control information, wherein the at least one indicated coefficient is represented by four bits out of fourteen bits with the four bits not being needed in the downlink control information in the unlicensed spectrum for downlink resource allocation;

means for determining at least one coefficient based on the at least one indicated coefficient;

means for calculating a transport block size column index based on the number of resource blocks and the at least one coefficient;

means for determining the transport block size based at least in part on the transport block size column index and a modulated coding scheme row index assigned to a physical uplink shared channel (PUSCH); and means for transmitting the data on the uplink over the unlicensed spectrum based at least in part on the transport block size.

17. An apparatus for determining a transport block size for transmitting data, comprising:

a data identification component configured to identify data to be transmitted on an uplink over an unlicensed spectrum, wherein the data is associated with a number of resource blocks;

a coefficient determination component configured to:
receive at least one indicated coefficient via downlink control information, wherein the at least one indicated coefficient is represented by four bits out of fourteen bits with the four bits not being needed in the downlink control information in the unlicensed spectrum for downlink resource allocation, and
determine at least one coefficient based on the at least one indicated coefficient;

a transport block size column index calculation component configured to calculate a transport block size column index based on the number of resource blocks and the at least one coefficient;

a transport block size determination component configured to determine the transport block size based at least in part on the transport block size column index and a modulated coding scheme row index assigned to a physical uplink shared channel (PUSCH); and a transmitter configured to transmit the data on the uplink over the unlicensed spectrum based at least in part on the transport block size.

18. The apparatus of claim 17, wherein the at least one coefficient corresponds to an offset parameter, and the transport block size column index is shifted from the number of resource blocks based on the offset parameter.

19. The apparatus of claim 17, wherein the at least one coefficient corresponds to a scaling factor, and the transport block size column index is scaled from the transport block size column index based on the scaling factor.

20. The apparatus of claim 17, wherein the coefficient determination component is further configured to determine the at least one coefficient based on a layer 3 configuration.

21. The apparatus of claim 17, wherein the coefficient determination component is further configured to determine the at least one coefficient based on a mapping table.

22. The apparatus of claim 17, wherein a value range of the at least one coefficient depends on a subframe type.

23. The apparatus of claim 22, wherein the subframe type includes one of a regular uplink subframe, a special subframe, or a subframe exempt from clear channel assessment.

24. The apparatus of claim 17, wherein a value of the at least one coefficient depends on a portion of a subframe available for transmission on the uplink.

25. The apparatus of claim 17, wherein the at least one coefficient corresponds to an adjustment factor, wherein the adjustment factor is a function of the number of resource blocks.

26. The apparatus of claim 17, wherein the at least one coefficient has a value corresponding to uplink data including channel state information feedback independent of an uplink shared channel (UL-SCH).

27. The apparatus of claim 17, wherein transmitting the data includes transmitting the data according to a multiple-input multiple-output (MIMO) scheme having two codewords, and wherein the at least one coefficient is the same for each of the two codewords.

28. The apparatus of claim 17, wherein the at least one coefficient depends on a resource allocation granularity for transmission on the uplink.

29. The apparatus of claim 17, further comprising a bitmap determination component configured to:
determine a number of interlaces based on a system bandwidth;
determine a number of interleaved resource blocks based on the system bandwidth;
generate a bitmap based on the number of interlaces and the number of interleaved resource blocks; and
allocate resources based on the bitmap.

* * * * *